United States Patent
Thomas et al.

(10) Patent No.: US 11,718,724 B2
(45) Date of Patent: Aug. 8, 2023

(54) SYSTEM FOR DIMENSIONALLY STABLE ISOCYANATE-FREE POLYURETHANE FOAM

(71) Applicant: DDP SPECIALTY ELECTRONIC MATERIALS US, INC., Collegevile, PA (US)

(72) Inventors: Megan Thomas, Midland, MI (US); Nicole L. Wagner, Midland, MI (US); William G. Stobby, Midland, MI (US); Herbert N. Praay, Midland, MI (US)

(73) Assignee: DDP SPECIALTY ELECTRONIC MATERIALS US, LLC., Wilmington, DE (US)

( * ) Notice: Subject to any disclaimer, the term of this patent is extended or adjusted under 35 U.S.C. 154(b) by 0 days.

(21) Appl. No.: 16/315,509

(22) PCT Filed: Jun. 19, 2017

(86) PCT No.: PCT/US2017/038094
§ 371 (c)(1),
(2) Date: Jan. 4, 2019

(87) PCT Pub. No.: WO2018/005142
PCT Pub. Date: Jan. 4, 2018

(65) Prior Publication Data
US 2020/0181348 A1    Jun. 11, 2020

Related U.S. Application Data

(60) Provisional application No. 62/355,383, filed on Jun. 28, 2016.

(51) Int. Cl.
C08J 9/00 (2006.01)
C08G 71/04 (2006.01)
C08J 9/14 (2006.01)

(52) U.S. Cl.
CPC ............ *C08J 9/0066* (2013.01); *C08G 71/04* (2013.01); *C08J 9/146* (2013.01); *C08J 2201/022* (2013.01); *C08J 2203/142* (2013.01); *C08J 2375/04* (2013.01)

(58) Field of Classification Search
CPC .................................................. C08J 9/0066
See application file for complete search history.

(56) References Cited

U.S. PATENT DOCUMENTS

| 5,175,231 | A | 12/1992 | Rappoport et al. | |
|---|---|---|---|---|
| 5,278,196 | A * | 1/1994 | Robin | C08J 9/144 521/146 |
| 6,221,929 | B1 * | 4/2001 | Ryugo | C08G 18/088 521/114 |
| 8,653,174 | B2 * | 2/2014 | Anderson | C09D 175/12 524/391 |
| 2010/0101165 | A1 * | 4/2010 | Buffy | B29C 44/1233 52/309.4 |
| 2011/0313091 | A1 * | 12/2011 | Argyropoulos | C08G 18/792 524/391 |
| 2014/0369850 | A1 * | 12/2014 | Popa | C09D 133/10 416/241 A |
| 2016/0083517 | A1 * | 3/2016 | Beigzadeh | C08L 33/066 528/368 |

FOREIGN PATENT DOCUMENTS

WO    2015/142564 A1    9/2015

OTHER PUBLICATIONS

Jing Guan et al, Progress in Study of Non-Isocyanate Polyurethane, Industrial & Engineering Chemistry Research, 2011, pp. 6517-6527, 50(11), ACS Publications.
Zygmunt Wirpsza et al, Segmented Condensation Polyether Urethanes as Components of Leather-Like Polymers, Polimery 2002, 47, No. 5.

* cited by examiner

*Primary Examiner* — Irina Krylova

(57) ABSTRACT

A polymer foam system comprises a polyaldehyde, an inorganic powder, a polycarbamate, a blowing agent and an acid catalyst wherein the polyaldehyde is in an A-side of the polymer foam system and the polycarbamate is in a B-side of the polymer foam system wherein the inorganic powder is selected from a group consisting of Group II oxides and hydroxides, the polyaldehyde has an average functionality of more than one and three or less, the polycarbamate has an average functionality of 3.4 or more and 4.2 or less, the polycarbamate has an average equivalent weight of 200 grams per equivalent or more and 325 grams per equivalent or less, and the average particle size of the inorganic powder in micrometers divided by the ratio of concentration in millimoles of inorganic powder to acid catalyst is 2.5 or more an 9.3 or less.

6 Claims, No Drawings

SYSTEM FOR DIMENSIONALLY STABLE ISOCYANATE-FREE POLYURETHANE FOAM

BACKGROUND OF THE INVENTION

Field of the Invention

The present invention relates to a system of components useful for preparing dimensionally stable isocyanate-free polyurethane foam. The system of the present invention produces a polyaminal foam.

INTRODUCTION

Polyurethane foam sealants are popular for use in the building and construction market. However, it is desirable to identify non-isocyanate based sealants that perform similarly to polyurethane foam sealants in order to avoid perceived health and safety concerns related to residual isocyanates.

One alternative to isocyanate-based polyurethane foam sealants is taught in WO2015/142564 ("WO564"). WO564 discloses biodegradable crosslinked polyaminal foam. The polyaminal foam is made from a reaction of a polycarbamate with a polyfunctional aldehyde. The foam of WO564 has a characteristic of being biodegradable. The biodegradability of the foam is attributed to hydrolytic instability of the polyaminal. In the presence of water, the polyaminal is believed to be hydrolyzed back to an aldehyde, especially at elevated temperatures (that is, temperatures of 40 degrees Celsius (° C.) or higher). It is desirable to identify an isocyanate-free foam sealant that demonstrates hydrolytic stability, particularly at elevated temperature.

U.S. Pat. Nos. 5,175,231, 8,653,174B2, and US20110313091 each disclose what is purported to be water resistant isocyanate-free polyurethane. Even so, it is desirable to increase the hydrolytic stability of an isocyanate-free polyurethane foam such that the foam achieves less than about 25 percent (%), preferably 20% or less, more preferably 10% or less volume changes after exposure to an environment of 70 degrees Celsius (° C.) and 97% relative humidity for 24 hours.

BRIEF SUMMARY OF THE INVENTION

The present invention provides a solution to the challenge of identifying a foaming system that produces an isocyanate-free foam sealant that demonstrates hydrolytic stability, particularly at elevated temperature. In particular, the present invention provides a polyurethane foam that achieves less than 25 percent (%), preferably 20% or less, more preferably 10% or less volume changes after exposure to an environment of 70 degrees Celsius (° C.) and 97% relative humidity for 24 hours. Surprisingly, the present invention uses polyaminal foam chemistry, but achieves hydrolytic stability even at elevated temperatures due to specific selection of polycarbamate and the presence of a Group II (Alkali-earth metal) oxide or hydroxide powder of a particular size and concentration relative to acid catalyst.

In a first aspect, the present invention is a polymer foam system comprising a polyaldehyde, an inorganic powder, a polycarbamate, a blowing agent and an acid catalyst wherein the polyaldehyde is in an A-side of the polymer foam system and the polycarbamate is in a B-side of the polymer foam system, the inorganic powder can be a separate component from the A- and B-sides or is in one or both of the A- and B-sides provided that the inorganic powder is not in the same side as the acid catalyst, the acid catalyst can be a separate component from the A- and B-side or is in the B-side and the blowing agent is in the A-side, the B-side, both A- and B-sides or can be a separate component from the A- and B-sides, and further wherein: (a) the inorganic powder is selected from a group consisting of Group II oxides and hydroxides; (b) the polyaldehyde has an average functionality of more than one and three or less; (c) the polycarbamate has an average functionality of 3.4 or more and 4.2 or less; (d) the polycarbamate has an average equivalent weight of 200 grams per equivalent or more and 325 grams per equivalent or less; and (e) the average particle size of the inorganic powder in micrometers divided by the molar ratio of inorganic powder to acid catalyst is 2.5 or more and 9.3 or less; with average equivalent weight determined as taught herein, average particle size of the inorganic powder determined by ASTM B822-10, and the concentration of inorganic powder determined according to ASTM D7247-10.

In a second aspect, the present invention is a method of preparing polymer foam, the method comprising mixing together a polymer foam system comprising a polyaldehyde, an inorganic powder, a polycarbamate, a blowing agent and an acid catalyst and allowing them to react and expand into a polymer foam, wherein (a) the inorganic powder is selected from a group consisting of Group II oxides and hydroxides; (b) the polyaldehyde has an average functionality of more than one and three or less; (c) the polycarbamate has an average functionality of 3.4 or more and 4.2 or less; (d) the polycarbamate has an average equivalent weight of 200 grams per equivalent or more and 325 grams per equivalent or less; and (e) the average particle size of the inorganic powder in micrometers divided by the molar ratio of inorganic powder to acid catalyst is 2.5 or more and 9.3 or less; with average equivalent weight determined as taught herein, average particle size of the inorganic powder determined by ASTM B822-10, and the concentration of inorganic powder determined according to ASTM D7247-10.

In a third aspect, the present invention is a polymer foam comprising the reaction product of the polymer foam system of the first aspect.

The present invention is useful for preparing isocyanate-free polyurethane foam sealants and applying such foam sealants, for example, to building structures.

DETAILED DESCRIPTION OF THE INVENTION

"And/or" means "and, or alternatively". All ranges include endpoints unless otherwise stated. Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

A polymer foam system is a combination of materials that can be combined to prepare polymer foam. The polymer foam system of the present invention is desirably a two-component ("2K") foam system, which means the system materials are stored as at least two separate components that when mixed together chemically react and expand to form a polymer foam. A 2K foam system usually comprises an A-side and a B-side that are kept separate until mixed together to form a polymer foam.

The polymer foam system of the present invention comprises a polyaldehyde, an inorganic powder, a polycarbamate, a blowing agent and an acid catalyst. The polyaldehyde and polycarbamate are kept apart from one another until such time as foaming is desired. As such, the polyaldehyde is considered part of an A-side of the polymer foam system and the polycarbamate is considered part of a B-side of the polymer foam system. Notably, "polyaldehyde" refers to a molecule having multiple aldehyde functionalities ("formyl group" or —CHO) as opposed to implying the molecule is necessarily a polymer. Similarly, "polycarbamate" refers to a molecule having multiple carbamate groups ($H_2NC(O)O$—) as opposed to implying the molecule is necessarily a polymer.

The polyaldehyde has an average functionality of more than one and three or less. Average functionality of a polyaldehyde refers to the average number of aldehyde groups per molecule. Determine polyaldehyde functionality using the test method "Determining Average Functionality of Polyaldehyde" as set forth herein below under the section "Characterization Methods".

Examples of suitable polyaldehydes include one or any combination of more than one selected from alicyclic or aromatic dialdehydes containing five to eleven carbon atoms. Especially desirable is cyclohexanedicarbaldehyde (CHDA), including one or any combination of more than one polyaldehyde selected from a group consisting of (cis, trans)-1,4-CHDA and (cis,trans)-1,3-CHDA.

The inorganic powder can be a can be a separate component from the A- and B-sides or is in one or both of the A- and B-sides provided that the inorganic powder is not in the same side as the acid catalyst. Desirably, the inorganic powder is part of the A-side of the polymer foam system.

The inorganic powder is selected from a group consisting of Group II oxides and hydroxides. "Group II" refers to group II of the periodic table of the elements and consists of the following elements: beryllium (Be), magnesium (Mg), calcium (Ca), strontium (Sr), barium (Ba), and radium (Ra). The inorganic powder can be any one or any combination of more than one Group II oxide and/or hydroxide. Desirably, the inorganic powder is selected from one or a combination of more than one material from a group consisting of magnesium oxide, magnesium hydroxide, and calcium oxide.

The average particle size of the inorganic powder is desirably three micrometers (μm) or larger, and can be five μm or larger, 10 μm or larger, 15 μm or larger and even 20 μm or larger while at the same time is generally 25 μm or smaller, and can be 20 μm or smaller, 15 μm or smaller and even 10 μm or smaller. Determine average particle size for the inorganic powder according to ASTM B822-10.

Surprisingly and unexpectedly, the size of the inorganic powder relative to the concentration of acid catalyst impacts the hydrolytic stability of a polymer foam produced by the polymer foam system upon foam formation and without any post-foaming treatments of the foam. When the average particle size of the inorganic powder (measured in micrometers) divided by the molar ratio of inorganic powder to acid catalyst is 2.5 or more and preferably 3.0 or more, 3.5 or more, 4.0 or more, 4.5 or more, 5.0 or more, 5.5 or more, 6.0 or more, 6.5 or more, 7.0 or more, 7.5 or more and even 8.0 or more while at the same time is 9.5 or less, preferably 9.3 or less, 9.0 or less, 8.5 or less, 8.0 or less, 7.5 or less, 7.0 or less, 6.5 or less, 6.0 or less, 5.5 or less and even 5.0 or less then the hydrolytic stability of a foam resulting from the polymer foam system demonstrates particularly high hydrolytic stability even at an elevated temperature without any post-foaming treatments of the foam.

"Particularly high hydrolytic stability" means that a foam sample that has dimensions of one centimeter (cm) by one cm by one cm demonstrates 30% or less, preferably 20% or less, more preferably 10% or less volume change upon exposure to an environment of 70 degrees Celsius (° C.) and 97% relative humidity for 24 hours. "Elevated temperature" refers to 70° C.

The inorganic powder is typically present at a molar ratio of 0.04 millimoles (mmoles) or more, and can be 0.05 mmoles or more, 0.08 mmoles or more, 0.10 mmoles or more 0.12 mmoles or more 0.14 mmoles or more, 0.16 mmoles or more, 0.18 mmoles or more, 0.20 mmoles or more, 0.25 mmoles or more, 0.30 mmoles or more, 0.35 mmoles or more, 0.40 mmoles or more, and even 0.45 mmoles or more while at the same time is typically 0.50 mmoles or less, and can be 0.45 mmoles or less, 0.40 mmoles or less, 0.35 mmoles or less, 0.30 mmoles or less, 0.25 mmoles or less, 0.22 mmoles or less, 0.20 mmoles or less, 0.18 mmoles or less, 0.16 mmoles or less, 0.14 mmoles or less, 0.12 mmoles or less and even 0.10 mmoles or less per mmole of aldehyde functionality.

The polycarbamate is part of the B-side of the polymer foam system. The polycarbamate can be, for example, a condensation product of one or more polyols with an unsubstituted carbamic acid alkyl ester or urea. Suitable polyols include, for example, an acrylic, saturated polyester, alkyd, polyether, or polycarbonate polyol.

The polycarbamate has an average equivalent weight of 200 grams per equivalent (g/eq) or more, and can have an average equivalent weight of 250 g/eq or more or even 300 g/eq or more while at the same time has an equivalent weight of 325 g/eq or less. "Equivalent weight" refers to the mass of a material (in this case, polycarbamate) per reactive site on the material (in this case, per carbamate group on the polycarbamate). If the average equivalent weight exceeds 325 g/eq then there is generally not enough crosslink density to produce a stable foam structure.

Determine polycarbamate equivalent weight using the following equation, where Mn is a number average molecular weight:

$$\text{Polycarbamate equivalent weight} = (Mn_{polycarbamate})/(f_{polycarbamate}) \qquad (1)$$

Desirably, the polycarbamate has an average functionality ($f_{polycarbamate}$) of 3.4 or more, preferably 3.8 or more and can be 3.9 or more while at the same time is typically 8 or less, more typically 6 or less, even more typically 5 or less and is desirably 4.2 or less, preferably 4.1 or less and can be 4.0 or less. When the functionality is below 3.4, the resulting foam has insufficient crosslinking to achieve dimensional stability. Functionality greater than 4.2 is difficult to find commercially but is expected to be suitable. Functionality for polycarbamate refers to the average number of carbamate groups per polycarbamate molecule. Determine the molecular weight and functionality for the polycarbamate according to the method "Determine Molecular Weight and Average Functionality of Polycarbamate" set forth herein below under the section "Characterization Methods".

The acid catalyst can be a separate component from the A- and B-side or is in the B-side of the polymer foam system. The acid catalyst promotes the reaction between the polycarbamate and polyaldehyde upon mixing of the A-side and B-side to form polymeric foam. The acid catalyst can be selected from Lewis acid and protic acids. Desirably, the acid catalyst is a protic acid. Preferably, the acid catalyst is an organic protic acid selected from a group consisting of carboxylic acids, phosphonic acids and sulfonic acids. Suitable carboxylic acids include acetic acid, trifluoracetic acid, propionic acid, dicarboxylic acid and combinations thereof. Suitable phosphonic acids include methylphosphonic acid. Suitable sulfonic acids include methanesulfonic acid, benzenesulfonic acid, camphorsulfonic acid, dodecylbenzene sulfonic acid, para-toluenesulfonic acid, and combinations thereof.

The acid catalyst is typically present in the polymer foam system at a molar ratio of 0.04-0.05 mmoles of catalyst per mmole of carbamate functionality.

When preparing foam, provide the A-side and B-side at a relative concentration sufficient to achieve an average particle size of the inorganic powder (measured in µm) divided by the molar ratio of inorganic powder to acid catalyst as described above to as to achieve the surprising and unexpected particularly high hydrolytic stability of the resulting foam.

At the same time, the A-side and B-side desirably is mixed at a relative concentration sufficient to provide a molar ratio of carbamate functionalities relative to aldehyde functionalities that is 0.9 or more and generally 2 or less, more typically 1.5 or less, and yet more typically 1.1 or less per mmole of aldehyde functionality.

The blowing agent is in the A-side, the B-side, both A- and B-sides or can be a separate component from the A- and B-sides. The blowing agent is useful for expanding the components of the polymer foam system into a foam structure. The blowing agent can be any blowing agent used in the polyurethane foam systems. Examples of suitable blowing agents include any one or combination of more than one blowing agent selected from a group consisting of cyclopentane; 1,1,1,3,3-pentafluropropane (HFC-245fa); trans-1-chloro-3,3,3-trifluoropropene; cis-1,1,1,4,4,4-hexafluoropropene; trans-1,1,1,4,4,4-hexafluoro-2-butene, 1,3,3,3-tetrafluoropropene; 1,1,1,4,4,4-hexafluorobutene; 1,1,1,2-tetrafluoroethane (HFC-134a); and 2,3,3,3-tetrafluoropropene.

The concentration of blowing agent in the polymer foam system is desirably 0.3 moles or more, preferably 0.5 moles or more and can be 0.7 moles or more, 0.9 moles or more, 1.1 moles or more, 1.3 moles or more, 1.4 moles or more, 1.5 moles or more and even 1.7 moles or more while at the same time is generally 1.9 moles or less and can be 1.7 moles or less, 1.6 moles or less, 1.5 moles or less, 1.3 moles or less, 1.1 moles or less or 1.0 moles or less per kilogram of polymer foam system.

The polymer foam system can comprise a surfactant. A surfactant is desirable to facilitate foam formation and foam stabilization. If present, the surfactant is typically in the B-side of the polymer foam system. Suitable surfactants include those selected from a group consisting of silicone polyether copolymers (for example, polydimethylsiloxane-polyalkylene block copolymers), silicone oils, and silicone-free surfactants. Particularly desirably surfactants include silicone surfactants such as silicone polyether copolymers including that sold under the tradename DABCO™ DC5098. (DABCO is a trademark of Air products and Chemicals, Inc.). The concentration of surfactant is generally 0.5 weight-percent (wt %) or more, preferably 1.0 wt % or more, more preferably 1.5 wt % or more, even more preferably 2.0 wt % or more and can be 2.2 wt % or more, 2.4 wt % or more and even 2.5 wt % or more while at the same time is typically 5 wt % or less, preferably 4 wt % or less, more preferably 3 wt % or less and can be 2.9 wt % or less based on total weight of B-side.

The polymer foam system can comprise a fire retardant. If present, the fire retardant is typically in the B-side of the polymer foam system. The fire retardant can be any that are suitable for use in polyurethane foam systems. Examples of suitable flame retardants include any one or combination of more than one selected from a group consisting of organohalogen compounds (such as organochlorides, organobromides, brominated polymers and chlorinated materials), organophosphorous compounds and halo-alkyl phosphates. One desirable flame retardant is tetrabromophthalate diol. The concentration of flame retardant is generally 0.2 wt % or more, preferably 0.5 wt % or more and can be 1.0 wt % or more, 3.0 wt % or more, 5.0 wt % or more 8 wt % or more, 10 wt % or more, 15 wt % or more and even 18 wt % or more while at the same time is typically 20 wt % or less, preferably 18 wt % or less, more preferably 15 wt % or less and can be 12 wt % or less, 10 wt % or less, 8 wt % or less and even 5 wt % or less based on total weight of the B-side.

The polymer foam system can comprise additional ingredients from those already mentioned. For example, the polymer foam system can comprise (or be free of) any one or combination of more than one of plasticizer, filler, colorant, preservatives, odor masks, biocides, antioxidants, ultraviolet stabilizers, acid scavengers, and antistatic agents.

A desirable feature of the present invention is that it does not require isocyanates. In fact, the polymer foam system and foam prepared therefrom can be free of isocyanate.

The polymer foam system of the present invention is useful for making polymer foam. The method for making polymer foam from the polymer foam system comprises forming a foamable mixture by mixing the components of the polymer foam system together at a ratio that produces a foamable mixture characterized by the average particle size of the inorganic powder in micrometers divided by the molar ratio of inorganic powder to acid catalyst is 2.5 or more and preferably 3.0 or more, 3.5 or more, 4.0 or more, 4.5 or more, 5.0 or more, 5.5 or more, 6.0 or more, 6.5 or more, 7.0 or more, 7.5 or more and even 8.0 or more while at the same time is 9.5 or less, preferably 9.3 or less, 9.0 or less, 8.5 or less, 8.0 or less, 7.5 or less, 7.0 or less, 6.5 or less, 6.0 or less, 5.5 or less and even 5.0 or less.

At the same time, the A-side and B-side desirably are mixed so as to provide a molar ratio of carbamate functionalities relative to aldehyde functionalities that is 0.9 mmoles or more and generally 2 mmoles or less, more typically 1.5 mmoles or less, and even more typically 1.1 mmoles or less per mmole of aldehyde functionality.

Generally, the A- and B-sides of the polymer foam system are stored separately and then mixed by expelling them through a dispensing device that mixes the components to form a foamable mixture as the dispensing device is dispensing the foamable mixture onto a surface.

The foamable mixture obtained expands as the blowing agent expands and cures as the polycarbamate and polyaldehyde react with one another. Rate of curing is temperature dependent and is faster at higher temperatures. Curing desirably occurs at 20 degrees Celsius (° C.) or higher, preferably 40° C. or higher and most preferably 70° C. or higher. The resulting polymeric foam is a reaction product of the foaming system of the present invention.

The polymeric foam has a particularly high hydrolytic stability, even at elevated temperatures. That means that a 1 cm-by-1 cm-by-1 cm sample of the foam demonstrates 30% or less, preferably 20% or less, more preferably 10% or less volume change upon exposure to an environment of 70 degrees Celsius (° C.) and 97% relative humidity for 24 hours.

The polymeric foam desirably has a density 250 kilograms per cubic meter (kg/m$^3$) or less, more preferably 200 kg/m$^3$ or less, yet more preferably 195 kg/m$^3$ or less, even more preferably 170 kg/m$^3$ or less, yet even more preferably 150 kg/m$^3$ or less and at the same time is generally 20 kg/m$^3$ or more. Determine foam density according to ASTM method D1622.

Characterization Methods

Determining Average Functionality of Polyaldehyde

Step 1: Determine the Molecular Formula of the Polyaldehyde by Liquid Chromatography-Mass Spectrometry (LC-MS) Using Accurate Mass Measurements.

LC-MS Analysis.

To a glass LC-MS vial, add approximately 0.001 gram of polyaldehyde material and dilute with one milliliter of solvent. Shake gently until completely dissolved. Inject appropriate volume of sample onto the reversed phase LC-MS instrument. Using a reverse phase column and a gradient composed of 0.1% formic acid in water (mobile phase A) and 0.1% formic acid in acetonitrile (mobile phase B), perform a standard linear ramp of high concentration of A and low concentration of B to low concentration of A and high concentration of B. Following liquid separation, perform mass analysis in positive and negative mode with the time of flight mass spectrometer. Using the accurate mass data and isotope pattern, subject the MS response to empirical prediction formula software ("MassHunter" from Agilent Instruments) to determine the empirical formula. Observe the mass-to-charge ratio and remove the cationizing reagent to determine the molecular weight.

GC-MS Analysis.

To a glass LC-MS vial, add approximately 0.01 grams of polyaldehyde material and dilute with one milliliter of solvent. Shake gently until completely dissolved. Inject appropriate volume of sample onto the GC-MS instrument. Using a temperature gradient, ramp the GC oven from low to high temperature, making sure not to exceed the temperature rating of the GC column. Following gaseous separation, perform mass analysis via electron impact and chemical ionization with the time of flight mass spectrometer. Using the accurate mass data and isotope pattern, subject the MS response to empirical prediction formula software ("MassHunter" from Agilent Instruments) to determine the empirical formula. Observe the mass-to-charge ratio and remove the cationizing reagent to determine the molecular weight.

Use the empirical formula and molecular weight to determine the molecular formula. The number of carbon atoms in the molecular formula (X) is then used in Step 2 to determine the average polyaldehyde functionality.

Step 2.

Determine the average polyaldehyde functionality by quantitative C13 nuclear magnetic resonance spectroscopy (C13 NMR) after determining the molecular formula in Step 1.

C13 NMR.

To a glass vial add approximately 0.5 milliliters of pure polyaldehyde material and 2.4 milliliters of deuterated solvent. Shake until dissolved. Acquire quantitative NMR data per generally accepted practices such as described by Practical NMR Spectroscopy, Maryvonne L. Martin and Gerard J. martin with Jean-Jacques Delpuech, by Heyden & Sons., Ltd. (1980).

Reference the spectrum by setting a solvent peak to its known resonance ppm. Integrate all non-solvent carbon peaks and set the summed integral value equal to the number of carbon atoms (X) found in the molecular formula from Step 1.

The carbons of the —CHO aldehyde groups will resonate at approximately 206 ppm. Integrate the aldehyde carbons. When the value of the sum of all carbon integrals is set to X, the relative integral of only the aldehyde carbons will be the average polyaldehyde functionality.

Determining Molecular Weight and Average Functionality of Polycarbamate

Step 1.

Determine the molecular formula of the polycarbamate by liquid chromatography-mass spectrometer (LC-MS) and gas chromatography-mass spectrometry (GC-MS) using accurate mass measurements.

LC-MS Analysis.

To a glass LC-MS vial, add approximately 0.001 gram of polycarbamate material and dilute with one milliliter of solvent. Shake gently until completely dissolved. Inject appropriate volume of sample onto the reversed phase LC-MS instrument. Using a reverse phase column and a gradient composed of 0.1% formic acid in water (mobile phase A) and 0.1% formic acid in acetonitrile (mobile phase B), perform a standard linear ramp of high concentration of A and low concentration of B to low concentration of A and high concentration of B. Following liquid separation, perform mass analysis in positive and negative mode with the time of flight mass spectrometer. Using the accurate mass data and isotope pattern, subject the MS response to empirical prediction formula software ("MassHunter" from Agilent Instruments) to determine the empirical formula. Observe the mass-to-charge ratio and remove the cationizing reagent to determine the molecular weight.

GC-MS Analysis.

To a glass LC-MS vial, add approximately 0.01 grams of polycarbamate material and dilute with one milliliter of solvent. Shake gently until completely dissolved. Inject appropriate volume of sample onto the GC-MS instrument. Using a temperature gradient, ramp the GC oven from low to high temperature, making sure not to exceed the temperature rating of the GC column. Following gaseous separation, perform mass analysis via electron impact and chemical ionization with the time of flight mass spectrometer. Using the accurate mass data and isotope pattern, subject the MS response to empirical prediction formula software ("MassHunter" from Agilent Instruments) ("MassHunter" from Agilent Instruments) to determine the empirical formula. Observe the mass-to-charge ratio and remove the cationizing reagent to determine the molecular weight.

Use the empirical formula and molecular weight to determine the molecular formula. The number of carbon atoms in the molecular formula (Z) is then used in Step 2 to determine the average polycarbamate functionality.

Step 2.

Determine the average polycarbamate functionality by quantitative C13 nuclear magnetic resonance spectroscopy (C13 MR) after determining the molecular formula in Step 1.

C13 NMR.

To a glass vial add approximately 0.5 milliliters of pure polycarbamate material and 2.4 milliliters of deuterated solvent. Shake until dissolved. Acquire quantitative NMR data per generally accepted practices such as described by Practical NMR Spectroscopy, Maryvonne L. Martin and Gerard J. martin with Jean-Jacques Delpuech, by Heyden & Sons., Ltd. (1980).

Reference the spectrum by setting a solvent peak to its known resonance ppm. Integrate all non-solvent carbon peaks and set the summed integral value equal to the number of carbon atoms (Z) found in the molecular formula from Step 1.

The carbons of the —OC(O)NH$_2$ carbamate groups will resonate at approximately 156.4 ppm. Integrate the carbamate carbons. When the value of the sum of all carbon integrals is set to Z, the relative integral of only the carbamate carbons will be the average polycarbamate functionality.

Examples

Preparation of Polycarbamate

Preparation of polycarbamates follows the teachings of U.S. Pat. No. 8,653,174, Preparation 5. Prepare polycarbamates using the polyols of Table 1.

TABLE 1

| Polyol | Description |
|---|---|
| Polyol 1 | A 7 functional sucrose/glycerin initiated polyol, equivalent weight of approximately 200 g/eq, OH number of 280 milligrams potassium hydroxide per gram (mg KOH/gm), and a number average molecular weight of 1402 g/mol. The polyol is chain extended using ethylene oxide and propylene oxide (EO-PO) and has an average of approximately 25.6 wt % ethylene oxide unites based on total molecular weight. Polyol 1 is commercially available as VORANOL ™ 280 polyol (VORANOL is a trademark of The Dow Chemical Company). |
| Polyol 2 | A 7 functional sucrose/glycerin initiated polyol having an equivalent weight of approximately 150 g/eq, an OH number of 370 mg KOH/gm, and a number average molecular weight of approximately 1040 g/mol. Polyol 2 is commercially available as VORANOL ™ 370 polyol. |
| Polyol 3 | A 6 functional sorbitol perpoxylated polyol produced from the reaction of sorbitol and propylene oxide. Polyol 3 has an equivalent weight of approximately 117 g/eq, an OH number of 482 mg KOH/gm, and a number average molecular weight of approximately 700 g/mol. Polyol 3 is commercially available as VORANOL ™ RN482 polyol. |
| Polyol 4 | A 4 functional polypropylene glycol having an OH number of 378 mg KOH/gm and a number average molecular weight of approximately 600 g/mol. Polyol 4 is commercially available as Poly-G ™ 540-378 polyol (Poly-G is a trademark of The Monument Chemical Company, LLC). |

Polycarbamate 1.

Place 300 g (0.22 moles) Polyol 1, 112.38 g (1.50 moles) methyl carbamate and 2.24 g dibutyltin oxide into a 3-necked 1000 milliliter (mL) round bottom flask equipped with a mechanical stirrer, Dean Stark trap, condenser and nitrogen bubbler system. Flush the flask and contents with nitrogen gas and then heat slowly to 155 degrees Celsius (° C.). Methanol is produced as a reaction progresses. Collect the methanol and record its volume. When methanol ceased to be produced is significant quantities, allow nitrogen gas to flow through the flask, over the liquid contents, to drive methanol and excess methyl carbamate from the reaction mixture. After 7 hours, cool the reaction mixture to a pourable temperature and collect in wide-mouth glass jars as Polycarbamate 1. Polycarbamate 1 has a functionality of 3.9.

Polycarbamate 2.

Prepare Polycarbamate 2 in like manner as Polycarbamate 1 except using 300 g (0.29 moles) Polyol 2, 148.51 g (1.98 moles) methyl carbamate and 2.95 g dibutyltin oxide in a 3-necked 1000 milliliter (mL) round bottom flask equipped with a mechanical stirrer, Dean Stark trap, condenser and nitrogen bubbler system. Polycarbamate 2 has a functionality of 3.8.

Polycarbamate 3.

Prepare Polycarbamate 3 in like manner as Polycarbamate 1 except using 300 g (0.43 moles) Polyol 3, 193.46 g (2.58 moles) methyl carbamate and 3.85 g dibutyltin oxide in a 3-necked 1000 milliliter (mL) round bottom flask equipped with a mechanical stirrer, Dean Stark trap, condenser and nitrogen bubbler system. Polycarbamate 3 has a functionality of 3.4.

Polycarbamate 4.

Prepare Polycarbamate 4 in like manner as Polycarbamate 1 except using 300 g (0.5 moles) Polyol 4, 156.94 g (2.09 moles) methyl carbamate and 3.12 g dibutyltin oxide in a 3-necked 1000 milliliter (mL) round bottom flask equipped with a mechanical stirrer, Dean Stark trap, condenser and nitrogen bubbler system. Polycarbamate 4 has a functionality of 2.8.

Preparation of Cyclohexanedicarboxaldehyde (CHDA)

Prepare CHDA as an approximately 1:1 mixture of 1,3- and 1,4-cyclohexanedicarboxaldehydes following the procedure of Example 8 in U.S. Pat. No. 6,252,121 (incorporated herein by reference). Place a solution of rhodium dicarbonyl acetylacetonate and tris(2,4-bis(1,1-dimethylethylphenyl)phosphite ("Ligand C") in hexane containing 300 parts per million rhodium with a Ligand C/rhodium molar ratio of 20:1 in a Parr reactor and activate for approximately one hour at 90° C. and 689.5 kiloPascals of syngas (1:1 molar ratio of carbon monoxide and hydrogen). Charge 40 grams of 1,2,3,6-tetrahydrobenzaldehyde (prepare via a Diels Alder reaction of 1,3-butadiene and acrolein) to the autoclave and hydroformylate at 90° C. and 689.5 kPascals of syngas. Maintain the ratio of carbon monoxide and hydrogen at a 1:1 ratio during the course of reaction. Continue the reaction until gas chromatographic analysis shows complete consumption of 1,2,3, 6-tetrahydrobenzaldehyde. The selectivity to 1,3- and 1,4-cyclohexanedicarboxyaldehyde product is more than 95%. Cool the autoclave to approximately 25° C. and discharge the reaction mixture from the autoclave to give a two-phase system. The upper heptane phase contains predominantly the catalyst and Ligand C, which can be recycled for hydroformylation of another batch of 1,2,3,6-tetrahydrobenzaldehyde if desired. The lower phase is separated from the upper phase, washed with heptane and then purified by distillation to give an approximately 1:1 mixture of (cis/trans)-1,3-cyclohexanedicarboxaldehyde and (cis/trans)-1,4-cyclohexanedicarboxaldehyde for use as CHDA. CHDA has a functionality of 2.

Preparation of Polyurethane Foam

Example (Ex) 1

Prepare Example (Ex) 1 by heating a bulk mixture of Polycarbamate 2 (62.4 mmol equivalents), tetrabromophthalate diol ("TBPD", 3.9 mmol), triethyl phosphate ("TEP", 8.8 mmol) and silicone polyether copolymer surfactant (0.8 g). Weigh 2.86 mmol of p-toluenesulfonic acid catalyst into a 25-mL plastic syringe and set aside. In a 400 mL plastic beaker mix the bulk mixture with CHDA polyaldehyde (5.37 g, 71.9 mmol equivalents) and magnesium oxide powder (8.44 mmol, 25 micrometer (m) average particle size) with an air-blade mixer for approximately one minute or until components form a homogeneous mixture of continuous suspension. Add 1,1,1,3,3-pentafluoropropane (HFC-245fa) blowing agent intermittently with mixing until the target amount (39.2 mmol) is reached. Continue mixing until the mixture is homogeneous. While mixing, inject the catalyst from the plastic syringe and mix for another five seconds.

Allow the contents of the beaker to foam and cure for 24 hours at 70° C. The resulting foam is Ex 1.

Follow a similar procedure to prepare all of the Exs and Comparative Examples (Comp Ex) using the formulation parameters in Tables 2 and 3. Those elements of the procedure not addressed in Tables 2 and 3 are kept the same for preparing each of the Exs and Comp Exs.

Determine hydrolytic stability for each Ex and Comp Ex by cutting a one centimeter by one centimeter by one centimeter sample of foam from the center of the foam material. Place the sample in an aluminum dish and put in a chamber at 70° C. and 97% relative humidity for one hour. Remove the sample from the chamber, measure its dimensions and determine what percentage of volume the sample is relative to the initial one cubic centimeter volume. The percent change in volume is used as a measure of hydrolytic stability for the foam. Hydrolytic stability in percent volume change for each sample is reported in Table 4. For formulations that failed to form stable foam an "N/A" designation is reported for foam properties. Exs 1-16 demonstrate that within the breadth of the claim scope the formulation produces foam having a desirable hydrolytic stability (volume change of 25% or less).

Comp Exs A-S illustrate that the desirably hydrolytic stability is not achieved when outside the claim scope. Comp Ex I demonstrates a sample without inorganic powder. Comp Exs A-K and R illustrate samples with a Formulation Ratio that is either below 2.5 or above 9.3. Comp Exs L and M illustrate samples with a Polycarbamate average equivalent weight that is above 325 grams per equivalent. Comp Exs N and O illustrate samples where the polycarbamate functionality is below 3.4. Comp Exs P-S illustrate samples using an inorganic powder other than a Group II oxide and hydroxide.

TABLE 2

| Sample | Catalyst Amount (mmol) | Polyaldehyde CHDA (g)/(mmol) | Inorganic Powder | Ave. Particle Size (µm) | Amount (mmol) | Polycarbamate | molar equivalents (mmol) | Formulation Ratio* (µm) | TEP (mmol) | TBPD (mmol) | Blowing Agent 245fa amount (mmol) |
|---|---|---|---|---|---|---|---|---|---|---|---|
| Ex 1  | 2.86 | 5.37/71.88 | MgO     | 25  | 8.44  | Polycarbamate 2 | 62.4 | 8.5 | 8.8 | 3.9 | 39.16 |
| Ex 2  | 2.81 | 5.39/72.15 | MgO     | 25  | 8.93  | Polycarbamate 2 | 63.0 | 7.9 | 8.8 | 3.9 | 38.12 |
| Ex 3  | 2.74 | 5.37/71.88 | MgO     | 25  | 8.93  | Polycarbamate 2 | 64.0 | 7.7 | 9.0 | 3.9 | 36.63 |
| Ex 4  | 2.81 | 5.39/72.15 | MgO     | 3.3 | 2.71  | Polycarbamate 2 | 62.5 | 3.1 | 8.9 | 3.9 | 38.05 |
| Ex 5  | 2.83 | 5.37/71.88 | MgO     | 9.2 | 8.44  | Polycarbamate 2 | 62.2 | 3.1 | 8.8 | 3.9 | 38.05 |
| Ex 6  | 2.79 | 5.36/71.75 | MgO     | 25  | 14.14 | Polycarbamate 2 | 62.7 | 4.9 | 8.9 | 3.9 | 37.22 |
| Ex 7  | 2.90 | 5.39/72.15 | MgO     | 3   | 2.73  | Polycarbamate 2 | 62.7 | 3.2 | 8.9 | 3.9 | 35.88 |
| Ex 8  | 2.76 | 5.45/72.95 | MgO     | 9.2 | 2.73  | Polycarbamate 2 | 62.7 | 9.3 | 8.9 | 3.9 | 37.60 |
| Ex 9  | 2.86 | 5.37/71.88 | MgO     | 25  | 28.29 | Polycarbamate 2 | 62.2 | 2.5 | 8.8 | 3.9 | 39.54 |
| Ex 10 | 2.81 | 5.37/71.88 | Mg(OH)$_2$ | 14 | 8.56  | Polycarbamate 2 | 65.5 | 4.6 | 8.8 | 3.9 | 36.55 |
| Ex 11 | 2.83 | 5.42/72.55 | Mg(OH)$_2$ | 14 | 14.15 | Polycarbamate 2 | 64.7 | 2.8 | 8.7 | 3.8 | 38.05 |
| Ex 12 | 2.83 | 5.4/72.29  | CaO     | 14  | 8.47  | Polycarbamate 2 | 66.3 | 4.7 | 9.0 | 3.9 | 37.60 |
| Ex 13 | 2.79 | 5.37/71.88 | CaO     | 14  | 14.17 | Polycarbamate 2 | 66.5 | 2.8 | 9.0 | 3.9 | 35.81 |
| Ex 14 | 2.86 | 5.36/71.75 | MgO     | 9.2 | 2.85  | Polycarbamate 2 | 65.0 | 9.2 | 8.8 | 3.8 | 36.55 |
| Ex 15 | 2.90 | 6.16/82.46 | MgO     | 25  | 15.11 | Polycarbamate 3 | 77.6 | 4.8 | 8.6 | 4.4 | 37.37 |
| Ex 16 | 2.93 | 5.02/67.20 | MgO     | 25  | 14.77 | Polycarbamate 3 | 77.2 | 5.0 | 8.6 | 4.4 | 37.90 |

*"Formulation Ratio" is the ratio of the average particle size for the inorganic powder in micrometers divided by the molar ratio of inorganic powder to acid catalyst.

TABLE 3

| Sample | Catalyst Amount (mmol) | Polyaldehyde CHDA (g)/(mmol) | Inorganic Powder | Ave. Particle Size (µm) | Amount (mmol) | Polycarbamate | molar equivalents (mmol) | Formulation Ratio* (µm) | TEP (mmol) | TBPD (mmol) | Blowing Agent 245fa amount (mmol) |
|---|---|---|---|---|---|---|---|---|---|---|---|
| Comp Ex A | 2.86 | 5.56/74.43 | MgO | 3.3 | 28.29 | Polycarbamate 2 | 63.2 | 0.3 | 9.0 | 3.9 | 36.18 |
| Comp Ex B | 2.86 | 5.36/71.75 | MgO | 3.3 | 14.14 | Polycarbamate 2 | 62.2 | 0.7 | 8.8 | 3.9 | 37.52 |
| Comp Ex C | 2.81 | 5.35/71.62 | MgO | 3   | 27.50 | Polycarbamate 2 | 62.5 | 0.3 | 8.9 | 3.9 | 40.28 |
| Comp Ex D | 2.83 | 5.35/71.62 | MgO | 3   | 8.25  | Polycarbamate 2 | 63.5 | 1.0 | 9.0 | 3.9 | 38.05 |
| Comp Ex E | 2.83 | 5.38/72.02 | MgO | 3   | 15.34 | Polycarbamate 2 | 62.7 | 0.6 | 8.9 | 3.9 | 39.54 |
| Comp Ex F | 2.83 | 5.38/72.02 | MgO | 3   | 13.98 | Polycarbamate 2 | 62.7 | 0.6 | 8.9 | 3.9 | 38.05 |
| Comp Ex G | 2.83 | 5.39/72.15 | MgO | 9.2 | 14.14 | Polycarbamate 2 | 62.7 | 1.8 | 8.9 | 3.9 | 36.55 |
| Comp Ex H | 2.86 | 5.37/71.88 | MgO | 25  | 2.73  | Polycarbamate 2 | 62.5 | 26.2 | 8.9 | 3.9 | 40.13 |
| Comp Ex I | 2.83 | 5.36/71.75 | MgO | 9.2 | 28.29 | Polycarbamate 2 | 63.0 | 0.9 | 9.0 | 3.9 | 37.67 |

TABLE 3-continued

| Sample | Catalyst Amount (mmol) | Polyaldehyde CHDA (g)/(mmol) | Inorganic Powder | Ave. Particle Size (μm) | Amount (mmol) | Polycarbamate | molar equivalents (mmol) | Formulation Ratio* (μm) | TEP (mmol) | TBPD (mmol) | Blowing Agent 245fa amount (mmol) |
|---|---|---|---|---|---|---|---|---|---|---|---|
| Comp Ex J | 2.86 | 5.4/72.29 | MgO | 3.3 | 8.44 | Polycarbamate 2 | 62.2 | 1.1 | 8.8 | 3.9 | 36.63 |
| Comp Ex K | 2.88 | 5.37/71.88 | — | 0 | 0.00 | Polycarbamate 2 | 62.5 | N/A | 8.9 | 3.9 | 37.30 |
| Comp Ex L | 2.74 | 4.26/57.03 | MgO | 25 | 13.90 | Polycarbamate 1 | 50.7 | 4.9 | 8.8 | 3.2 | 38.19 |
| Comp Ex M | 2.74 | 4.28/57.29 | MgO | 3.3 | 2.85 | Polycarbamate 1 | 56.0 | 3.2 | 9.7 | 3.5 | 35.51 |
| Comp Ex N | 2.79 | 5.25/70.28 | MgO | 3.3 | 2.78 | Polycarbamate 4 | 80.2 | 3.3 | 8.9 | 3.7 | 39.39 |
| Comp Ex O | 2.81 | 5.25/70.28 | MgO | 25 | 14.34 | Polycarbamate 4 | 80.2 | 4.9 | 8.9 | 3.7 | 36.93 |
| Comp Ex P | 2.81 | 5.4/72.29 | CaCO$_3$ | 20 | 8.57 | Polycarbamate 2 | 66.0 | 6.6 | 8.9 | 3.9 | 37.45 |
| Comp Ex Q | 2.86 | 5.41/72.42 | CaCO$_3$ | 20 | 14.20 | Polycarbamate 2 | 65.2 | 4.0 | 8.8 | 3.9 | 35.58 |
| Comp Ex R | 2.86 | 5.39/72.15 | MgCO$_3$ | 9.9 | 2.83 | Polycarbamate 2 | 66.3 | 10.0 | 9.0 | 3.9 | 36.93 |
| Comp Ex S | 2.86 | 5.25/70.28 | MgCO$_3$ | 9.9 | 8.57 | Polycarbamate 2 | 62.9 | 3.3 | 8.5 | 3.7 | 38.79 |

*"Formulation Ratio" is the ratio of the average particle size for the inorganic powder in micrometers divided by molar the ratio of inorganic powder to acid catalyst.

TABLE 4

| Sample | Inorganic Powder | Polyaldehyde Functionality | Polycarbamate Functionality | Polycarbamate Ave Eq Wt | Formulation Ratio | Foam Density (kg/m$^3$) | Hydrolytic Stability (% Vol Change) |
|---|---|---|---|---|---|---|---|
| Ex 1 | MgO | 2 | 3.8 | 319.71 | 8.5 | 133 | 9.90 |
| Ex 2 | MgO | 2 | 3.9 | 315.73 | 7.9 | 131 | 10.6 |
| Ex 3 | MgO | 2 | 3.9 | 315.73 | 7.7 | 137 | 8.30 |
| Ex 4 | MgO | 2 | 3.8 | 319.71 | 3.1 | 124 | 8.10 |
| Ex 5 | MgO | 2 | 3.8 | 319.71 | 3.1 | 138 | 10.1 |
| Ex 6 | MgO | 2 | 3.8 | 319.71 | 4.9 | 170 | 5.90 |
| Ex 7 | MgO | 2 | 3.8 | 319.71 | 3.2 | 163 | 7.80 |
| Ex 8 | MgO | 2 | 3.8 | 319.71 | 9.3 | 166 | 10.0 |
| Ex 9 | MgO | 2 | 3.8 | 319.71 | 2.5 | 190 | 4.0 |
| Ex 10 | Mg(OH)$_2$ | 2 | 4.1 | 304.45 | 4.6 | 114 | 8.6 |
| Ex 11 | Mg(OH)$_2$ | 2 | 4.1 | 304.45 | 2.8 | 129 | 7.8 |
| Ex 12 | CaO | 2 | 4.1 | 304.45 | 4.7 | 128 | 8.3 |
| Ex 13 | CaO | 2 | 4.1 | 304.45 | 2.8 | 141 | 5.0 |
| Ex 14 | MgO | 2 | 4.1 | 304.45 | 9.2 | 140 | 11.4 |
| Ex 15 | MgO | 2 | 3.4 | 250.87 | 4.8 | 131 | 5.9 |
| Ex 16 | MgO | 2 | 3.4 | 250.87 | 5.0 | 76.4 | 6.10 |
| Comp Ex A | MgO | 2 | 3.8 | 319.71 | 0.3 | N/A | N/A |
| Comp Ex B | MgO | 2 | 3.8 | 319.71 | 0.7 | N/A | N/A |
| Comp Ex C | MgO | 2 | 3.8 | 319.71 | 0.3 | N/A | N/A |
| Comp Ex D | MgO | 2 | 3.8 | 319.71 | 1.0 | 173 | 60.9 |
| Comp Ex E | MgO | 2 | 3.8 | 319.71 | 0.6 | N/A | N/A |
| Comp Ex F | MgO | 2 | 3.8 | 319.71 | 0.6 | N/A | N/A |
| Comp Ex G | MgO | 2 | 3.8 | 319.71 | 1.8 | 236 | N/A |
| Comp Ex H | MgO | 2 | 3.8 | 319.71 | 26.2 | 172 | 28.1 |
| Comp Ex I | MgO | 2 | 3.8 | 319.71 | 0.9 | N/A | N/A |
| Comp Ex J | MgO | 2 | 3.8 | 319.71 | 1.1 | 219 | N/A |
| Comp Ex K | — | 2 | 3.8 | 319.71 | N/A | 206 | N/A |
| Comp Ex L | MgO | 2 | 3.9 | 400.81 | 4.9 | 193 | 15.3 |
| Comp Ex M | MgO | 2 | 3.9 | 400.81 | 3.2 | 195 | 20.1 |
| Comp Ex N | MgO | 2 | 2.8 | 251.27 | 3.3 | 375 | N/A |
| Comp Ex O | MgO | 2 | 2.8 | 251.27 | 4.9 | 374 | 8.3 |
| Comp Ex P | CaCO$_3$ | 2 | 4.1 | 304.45 | 6.6 | 126 | 51.8 |
| Comp Ex Q | CaCO$_3$ | 2 | 4.1 | 304.45 | 4.0 | 111 | 43.8 |
| Comp Ex R | MgCO$_3$ | 2 | 4.1 | 304.45 | 10.0 | 107 | 27.4 |
| Comp Ex S | MgCO$_3$ | 2 | 4.1 | 304.45 | 3.3 | 117 | 44.2 |

*"Formulation Ratio" is the ratio of the average particle size for the inorganic powder in micrometers divided by the molar ratio of inorganic powder to acid catalyst.

The invention claimed is:

1. A polymeric foam free of isocvanate that is a reaction product of a polymer foam system free of isocvanate comprising a polyaldehyde, an inorganic powder, a polycarbamate, a blowing agent and an acid catalyst, wherein the polyaldehyde is in an A-side of the polymer foam system and the polycarbamate is in a B-side of the polymer foam system, the inorganic powder can be a separate component from the A- and B-sides or is in one or both of the A- and B-sides provided that the inorganic powder is not in the same side as the acid catalyst, the acid catalyst can be a separate component from the A- and B-side or is in the B-side and the blowing agent is in the A-side, the B-side, both the A- and B-sides or can be a separate component from the A- and B-sides, and further wherein:
   a. the inorganic powder is magnesium oxide, magnesium hydroxide, or calcium oxide, the inorganic powder having an average particle size of 3 to 25 μm;
   b. the polyaldehyde has an average functionality of more than one and less than three;
   c. the polycarbamate has an average functionality of 3.4 or more and 4.1 or less;
   d. the polycarbamate has an average equivalent weight of 250 grams per equivalent or more and 320 grams per equivalent or less;
   e. the average particle size of the inorganic powder in micrometers divided by the molar ratio of the inorganic powder to the acid catalyst is 2.5 or more and 9.3 or less; and
   f. the molar ratio of the polyaldehyde to the polycarbamate is 0.87 to 1.16 with the polycarbamate average equivalent weight being mass of the polycarbamate per carbamate group on said polycarbamate, average particle size of the inorganic powder determined by ASTM B822-10, wherein the polyurethane foam made by the polymer foam system has a density of 76-195 kilograms per cubic meter as determined by ASTM method D1622 and demonstrates 4-10% of volume change after exposure to an environment of 70 degrees Celsius and 97 percent relative humidity for 24 hours.

2. The polymeric foam of claim 1, wherein the inorganic powder is part of the A-side and the acid catalyst is part of the B-side.

3. A method of preparing polymer foam free of isocyanate, the method comprising mixing together a polymer foam system free of isocyanate comprising a polyaldehyde, an inorganic powder, a polycarbamate, a blowing agent and an acid catalyst and allowing them to react and expand into a polymer foam,
   wherein:
   a. the inorganic powder is magnesium oxide, magnesium hydroxide, or calcium oxide, the inorganic powder having an average particle size of 3 to 25 μm;
   b. the polyaldehyde has an average functionality of more than one and less than three;
   c. the polycarbamate has an average functionality of 3.4 or more and 4.1 or less;
   d. the polycarbamate has an average equivalent weight of 250 grams per equivalent or more and 320 grams per equivalent or less;
   e. the average particle size of the inorganic powder in micrometers divided by the molar ratio of the inorganic powder to the acid catalyst is 2.5 or more and 9.3 or less; and
   f. the molar ratio of the polyaldehyde to the polycarbamate is 0.87 to 1.16, with the polycarbamate equivalent weight being mass of the polycarbamate per carbamate group on said polycarbamate, average particle size of the inorganic powder determined by ASTM B822-10, wherein the polyurethane foam made by the method has a density of 76-195 kilograms per cubic meter as determined by ASTM method D1622 and demonstrates 4-10% of volume change after exposure to an environment of 70 degrees Celsius and 97 percent relative humidity for 24 hours.

4. The method of claim 3, wherein the polyaldehyde is in an A-side and the polycarbamate is in a B-side, the inorganic powder is in one or both of the A- and B-sides or added separately from the A- and B-sides provided that the inorganic powder is not in the same side as the acid catalyst, the acid catalyst is either added separately from the A- and B-side or is in the B-side and the blowing agent is in the A-side, the B-side, both the A- and B-sides or added separately from the A- and B-sides.

5. The method of claim 4, wherein the inorganic powder is part of the A-side and the acid catalyst is part of the B-side.

6. The method of claim 4, wherein the A-side and the B-side are expelled from tanks under pressure through a dispensing device that mixes the A-side and the B-side together to form a foamable mixture as the dispensing device is dispensing the foamable mixture onto a surface.

* * * * *